United States Patent [19]
Wolfe

[11] 3,794,452
[45] Feb. 26, 1974

[54] APPARATUS USED IN REPAIRING DEFECTIVE SPOTS IN LARGE TIRES

[75] Inventor: Merritt W. Wolfe, Akron, Ohio

[73] Assignee: The Goodyear Tire & Rubber Company, Akron, Ohio

[22] Filed: Sept. 5, 1972

[21] Appl. No.: 285,987

[52] U.S. Cl.................................. 425/15, 425/26
[51] Int. Cl............................................. B29h 5/02
[58] Field of Search ..................... 425/11, 14, 15, 26

[56] References Cited
UNITED STATES PATENTS

| | | | |
|---|---|---|---|
| 1,579,391 | 4/1926 | Platt.................................. | 425/15 X |
| 2,320,778 | 6/1943 | Herman............................... | 425/15 |
| 2,370,241 | 2/1945 | Heintz................................ | 425/14 |
| 2,875,470 | 3/1959 | Goodman............................. | 425/26 |
| 2,889,579 | 6/1959 | Hedge................................. | 425/26 |
| 3,038,204 | 6/1962 | Van Scoyk.......................... | 425/14 |

*Primary Examiner*—J. Howard Flint, Jr.
*Attorney, Agent, or Firm*—F. W. Brunner; H. E. Hummer

[57] ABSTRACT

A portable apparatus used on the job site for repairing minor injuries in large earthmover tires which are not conveniently transportable. An arcuate segment with smooth inner faces for engaging the tire, is mounted for movement along a horizontally disposed trackway. A hydraulic cylinder is coupled to the segment for reciprocating the segment on the trackway towards and away from a vertically disposed hollow post around which a tire, to be repaired, is placed. A specially configured C-type clamp is coupled between the post and segment to bring the segment into greater compressive engagement with the tire positioned around the post.

14 Claims, 3 Drawing Figures

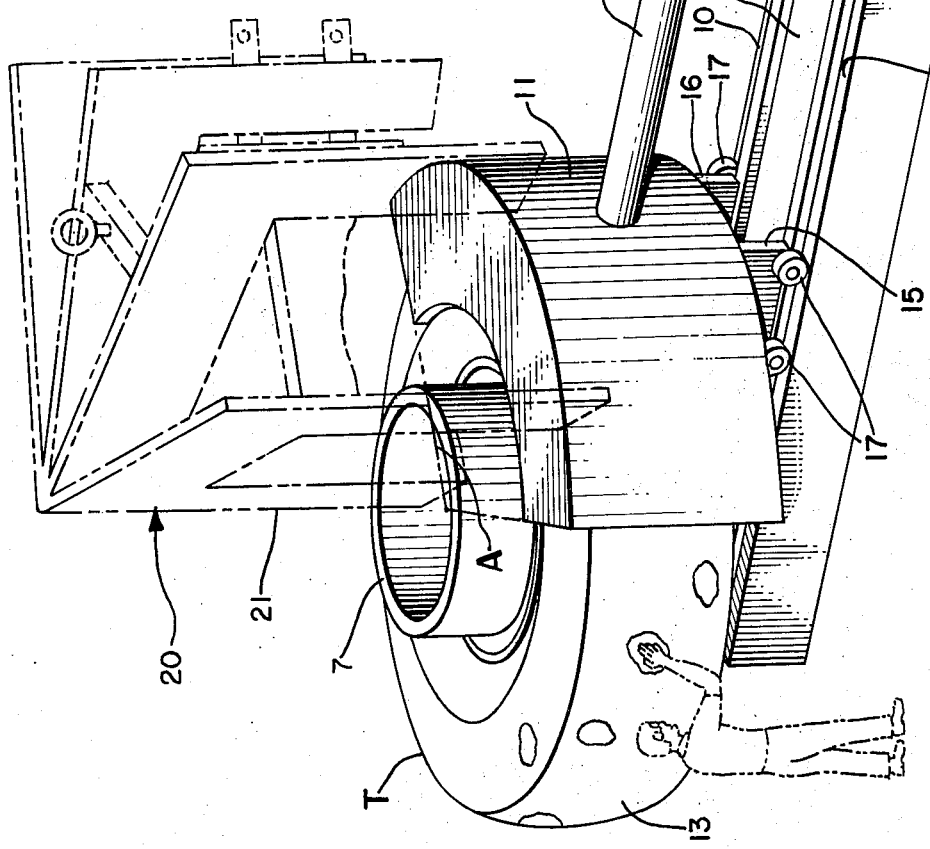

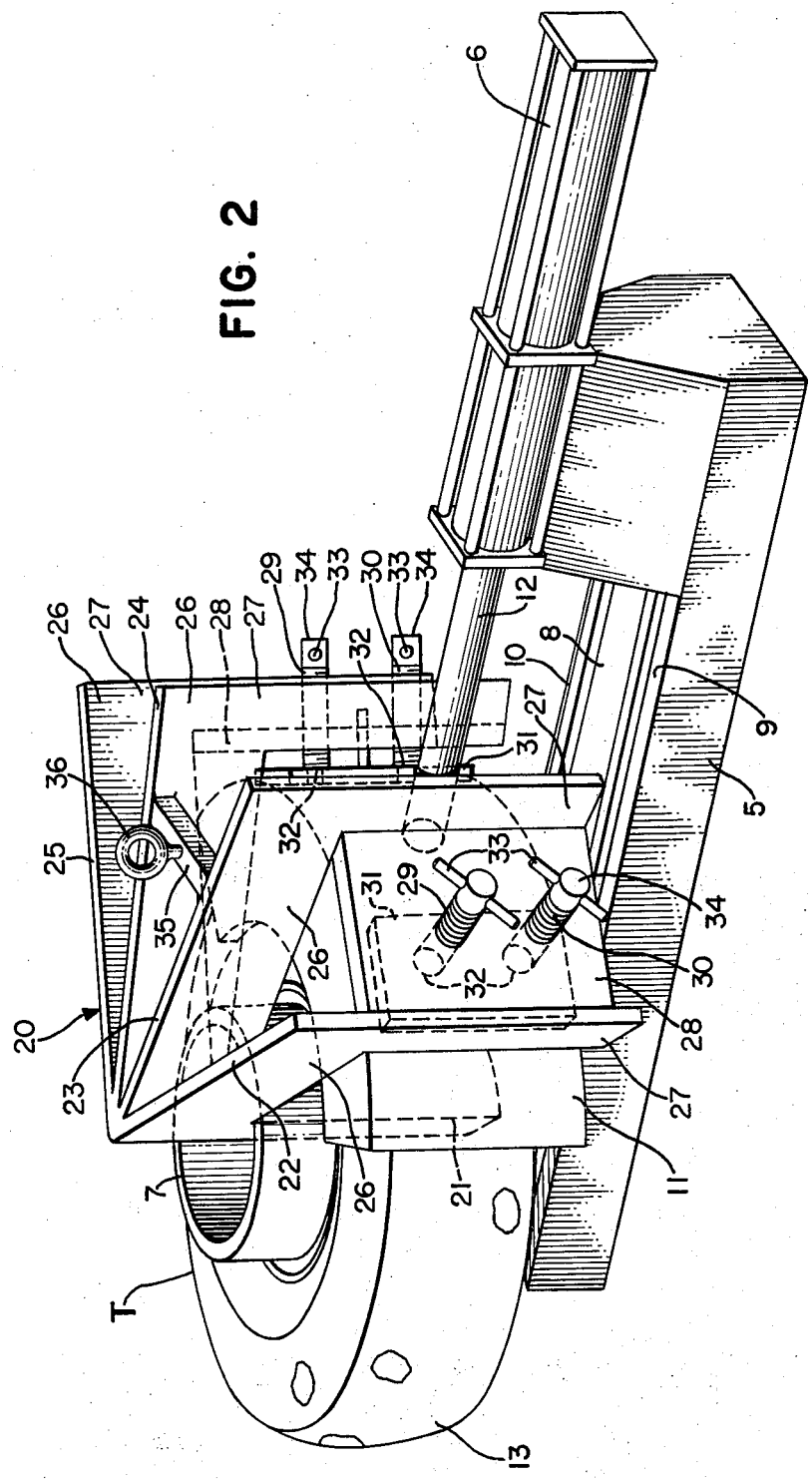

APPARATUS USED IN REPAIRING DEFECTIVE SPOTS IN LARGE TIRES

BACKGROUND OF THE INVENTION

The invention is designed for use in repairing minor injuries or damaged spots in the tread or sidewalls of large tires used on heavy earthmoving equipment employed in huge mining operations and dam building projects. These particular tires have diameters ranging from 6 to 15 feet depending on the size of the trucks or equipment being used. These tires are operated over very rugged terrain having sharply pointed rocks or other objects which can cut and damage the tire. A rock embedded in a cut in the tread of a tire acts like a drill and literally bores through the reinforced layers of rubber until the tire is ruined. Such a tire could be salvaged, if the cut or injury were immediately repaired. Many times, however, the tires are run to ruination and scrapped, simply because of the high cost and obstacles encountered in transporting the tires to a plant having the necessary facilities required for repairing and retreading such large tires. The problems involved are easily imagined when considering the transportation of a tire having, for example, a diameter of fifteen feet. The use of truck transportation presents the most difficult problems because of the height and width restrictions on the load. The tire could never be transported horizontally and, if placed in a vertical position, would require a minimum clearance of about 20 feet which is well over the acceptable standards for truck transportation, especially in areas having bridges where the maximum height requirement of a load is about thirteen and one-half feet. Transportation by rail or boat presents fewer problems, but truck transportation, even for short distances, is usually necessary. Many times it is easier to airlift the tires by helicopter to locations not readily accessible by rail, boat or truck transportation, but the costs are prohibitive such that this means of transportation is generally avoided. In some cases it is necessary to transport the tires thousands of miles back to the plant where the tire was originally built in order to repair the tire. The expenses involved are horrendous but minimal compared to the original cost of the tire.

It would be extremely beneficial to the user and repairman if these tires could be repaired on the job site rather than at a remote repair facility. To accomplish this, it is necessary to develop portable tire repair equipment which can be readily moved to and between different job locations. The invention is directed to providing such equipment which may, if necessary, be carried on the flat bed of a truck and easily transported to make immediate spot repairs on the tire and keep it from being ruined and consequently in service longer. As previously indicated, the invention is especially designed for use in making minor spot repairs to prevent major damage to the tire, since major repairs require more elaborate and cumbersome equipment, such as large curing kettles which completely enclose one or more tires. Moreover, in some cases, immediate spot repair prevents destruction of the tire casing which is very important, because the casing may be reused and retreaded at minimal cost to extend the life of the tire.

Briefly stated, the invention is in an apparatus used for making spot repairs in large earthmover tires. The apparatus comprises a single arcuate segment having smooth innerfaces or surfaces for contacting the tire. Means are provided for mounting the segment for movement along a trackway extending toward a hollow post around which a tire, to be repaired, is placed. A hydraulic cylinder is coupled to the segment and used for reciprocating the segment along the trackway. A clamp is provided and coupled between the post and segment for bringing the segment into greater compressibility with the area of the tire being repaired.

DESCRIPTION OF THE DRAWING

The following description of the invention will be better understood by having reference to the annexed drawing, wherein:

FIG. 1 is a perspective view of an apparatus made in accordance with the invention;

FIG. 2 is a perspective view of the apparatus showing a clamp in position for forcing the segment into more intimate contact with the tire mounted on the apparatus; and FIG. 3 is a perspective view of the segment.

DESCRIPTION OF THE INVENTION

Referring to FIGS. 1 and 2 of the drawing, there is shown an elongated base 5 which may, for example, be secured to the flat bed of a large tractor trailer. A hydraulic cylinder 6 is secured to the base 5 in parallel relation with the longitudinal axis of the base 5. A hollow cylinder or post 7 is secured to the base 5 in upstanding relation such that the longitudinal axis of the cylindrical post 7 is normal to the plane and longitudinal axis of the base 5. It is desirable maintaining the tire on its specific wheel rim when making the necessary spot repairs, because of the relatively high cost of demounting such large tires. This may be accomplished, for example, by providing a detachable post 7 which can be easily removed from the base 5 and replaced with a different post properly sized to accommodate the particular wheel rim on which the tire is mounted. Any appropriate means may be used to removably mount the post 7 on the base 5. In cases where the particular wheel rim has planetary gears, the tire must usually be dismounted and placed on a rim having a conventional, centrally disposed opening for receiving the post 7.

Any suitable means, e.g. plate 8, are used to form a pair of parallel raceways or tracks 9 and 10 in the base 5. The tracks 9 and 10 are also parallel to the longitudinal axis of the base 5 and form a trackway extending toward the post 7.

An arcuate segment 11 is coupled by a piston rod 12 to the hydraulic cylinder 6 which is used to reciprocate the segment 11 on the trackway formed by the tracks 9 and 10. The segment 11 is contoured to approximate the general shape of the tire in the area of the tread. Thus, the segment 11 has a generally U-shaped cross-section (FIG. 3). The segment 11 is defined between an angle A which is (1) less than 180 degrees, (2) selectively in the range of from 90–130 degrees, and (3) preferably slightly greater than 120 degrees, to cover one-third the circumference of the tire T measured at the outer periphery 13 of the tire positioned around the post 7. The segment 11 is provided with smooth inner faces or surfaces 14 for contacting adjacent portions of a tire positioned around the post 7. The segment 11 is preferably detachably coupled to the hydraulic cylinder 6, such that it can be removed and replaced with other segments of different size, this being desirable to accommodate a number of different tires which may vary in diameter by as much as 8-10 feet.

The segment 11 does not have the standard matrices of segmented molds used in retreading operations for forming the ribs and grooves in the tread of a tire. In such molds, three similar mold segments are normally provided for movement along separate trackways extending in radial directions towards a center post around which is positioned a tire having an uncured rubber tread which is molded and vulcanized as the mold segments move into annular abutting relation with each other and molding contact with the uncured tread rubber. The three mold segments completely encircle the tire. The use of a full circle mold in retreading a tire is desirable and practical because of the uniform periphery or circumference of similar size tires. This is not the case when making spot repairs, since the circumference of identical size tires, undergoing spot repairs, may vary appreciably depending on how badly worn the treads are. For example, the depth of worn treads may vary 1-3 inches which, in the case of a tire normally 15 feet in diameter, changes the outer periphery or circumference of the tires considerably. For this reason, in spot repair, it is desirable using a single segment which covers slightly more than one-third the circumference of the tire, such that the tire requires a maximum of three positions to repair damaged areas in any sector of the tire.

The segment 11 is conveniently secured to a pair of legs 15 and 16 which are mounted on a plurality of wheels, e.g. wheels 17, movable along the parallel tracks 9 and 10 formed on the base 5. The hydraulic cylinder 6 used in this portable type apparatus, is limited in size and normally not large enough to force the segment 11 into proper contact with a tire T mounted on the post 7. It has been found that a properly sized hydraulic cylinder would be too large for portable type equipment. It is simply more convenient using a smaller hydraulic cylinder 6 in combination with a multiple C-clamp 20 for exerting the additional force required to force the segment 11 into proper contact with the tire T, e.g. sufficient to produce a curing pressure against the spot repair of from 40-120 pounds per square inch (psi), with 80 psi being preferred.

The multiple C-clamp 20 (FIG. 2) is provided with a common newel 21 for insertion in the bore of the hollow post 7. The newel 21 has a pie-shaped cross-section, including an outer curved surface for mating engagement with the adjacent inner curved surface of the post 7. A plurality of L-shaped arms 22, 23, 24, and 25 extend from the newel 21 in a radial direction. The arms 22-25 each comprise a bridge portion 26 for extending over the segment 11 and an outstanding finger 27 which is parallel to the newel 21 and spaced farther from from the newel 21 than the segment 11. A bracket 28 is secured between the fingers 27 of the arms 22 and 23, and 24 and 25. The brackets 28 lie in planes normal to planes bisecting the angles between arms 22 and 23, and 24 and 25. A pair of tightening screws 29 and 30 threadably engage each of the brackets 28 and extend therethrough. A pressure plate 31 is coupled to the inner end 32 of each of the tightening screws 29 and 30 closest the newel 21. A lever 33 is coupled to the outer end 34 of each of the tightening screws 29 and 30 and used for rotating the screws 29 and 30 to move the attached pressure plates 31 into engagement with the adjacent segment 11.

A bar 35 is welded between the adjacent bridge portions 26 of the arms 23 and 24. An eyelet 36 is secured in upright relation of the bar 35 and utilized for fastening to the hook of a chain hoist, whereby the multiple C-clamp is lowered and raised into and out of position for engaging the post 7 and segment 11.

In operation, the various injuries or damaged areas in the tire T are reamed out in accordance with standard spot repair practices. The spots are then filled with unvulcanized rubber and reinforced with fabric, if required. After all of the spots are filled with unvulcanized rubber material, the tire T is positioned around the post 7. The hydraulic cylinder 6 is then operated to move the segment 11 into compressive engagement with the closest portion of the tire T. After the hydraulic cylinder 6 exerts a maximum safe operating pressure against the segment 11, the C-clamp 20 is moved into position as previously described. The threaded drive screws 29 and 30 are rotated to move the pressure plate 31 into tighter compressive engagement with the segment 11. Thus, both the hydraulic cylinder 6 and clamp 20 coact to force the segment 11 into appropriate contact with the unvulcanized rubber in the spots within the area covered by the segment 11. The segment 11 is then heated by any suitable means to heat and vulcanize the rubber materials of the spot repairs. For example, the segment 11 may be provided with passageways through which hot air or steam is circulated to heat the segment 11 to a temperature sufficient to heat and vulcanize the uncured rubber material contacting the segment 11. The pressure plates 31 are backed off and the C-clamp 20 removed, after the rubber material is vulcanized. The hydraulic cylinder 6 is then deactivated to move the segment 11 away from the tire T to permit its removal from the post 7, or rotation to a second position where other spot repairs can be contacted by the segment 11. An operator can make spot repairs in other areas of the tire not covered by the segment 11, during the time it takes to heat and vulcanize the rubber material of the spot repairs covered by the segment 11.

Thus, there has been provided a portable apparatus in which damaged earthmover tires can be repaired on the job site. Thus, small minor injuries to the tire can be quickly repaired to prevent major damage to the tire. Moreover, the tires can be returned to active service at minimal cost and loss of time in making the repairs.

I claim:

1. An apparatus used in repairing damaged areas in a tire, comprising:
   a. means for mounting a tire in fixed planar relation;
   b. a single arcuate segment having a generally U-shaped cross-section and smooth inner faces for contacting adjacent portions of a mounted tire;
   c. a trackway extending toward the tire mounting means;
   d. means for mounting the segment for movement along the trackway; and
   e. means coupled to the segment for reciprocating the segment on the trackway.

2. The apparatus of claim 1, wherein the tire mounting means (a) includes an elongated base and a cylinder secured to the base in upstanding relation, the longitudinal axis of the cylinder being normal to the plane and longitudinal axis of the base.

3. The apparatus of claim 1, wherein the arcuate segment is defined between an angle (A) less than 180 degrees.

4. The apparatus of claim 3, wherein the arcuate segment is defined between an angle (A) of about 120 degrees such that it covers about one-third the circumference of the tire measured at the outer periphery of the tread of a tire.

5. The apparatus of claim 1, wherein the trackway includes a pair of parallel tracks disposed on the base.

6. The apparatus of claim 1, wherein the means (e) for reciprocating the segment along the trackway includes a hydraulic cylinder coupled between the base and segment.

7. The apparatus of claim 1, which includes a clamp coacting between the tire mounting means and segment for helping force the segment into compressive engagement with a tire mounted on the apparatus.

8. The apparatus of claim 1, wherein the tire mounting means (a) includes: a base; a hollow, cylindrical post extending from the base and receivable in the opening; a wheel rim on which a tire is mounted; and means for detachably mounting the post on the base.

9. An apparatus used in repairing damaged spots in a tire, comprising:
   a. an elongated base;
   b. a hollow cylindrical post secured to the base in upstanding relation, the longitudinal axis of the post being normal to the plane and longitudinal axis of the base;
   c. a trackway disposed on the base and extending toward the post;
   d. a single arcuate segment mounted on wheels movable along the trackway, the segment having a generally U-shaped cross-section and smooth inner faces for contacting adjacent portions of a tire mounted in surrounding relation around the post, the segment defined between an angle (A) less than 180 degrees; and
   e. means coupled between the base and segment for reciprocating the segment on the trackway.

10. The apparatus of claim 9, wherein the base and post are designed to hold a tire in horizontal relation, when the post is disposed vertically.

11. The apparatus of claim 10, wherein the arcuate segment is defined between an angle (A) of about 120 degrees such that the segment covers about one-third the circumference of the tire measured at the outer periphery of the tread of the tire when the segment is positioned for engagement with the tire.

12. The apparatus of claim 11, which includes a clamp for coupling between the post and segment to help the hydraulic cylinder compress the segment against a tire positioned around the post, the clamp comprising:
   f. a newel for positioning in the bore of the hollow post;
   g. at least one pair of L-shaped arms extending from the newel in a radial direction, each arm including a bridge portion for spanning the segment and an outstanding finger parallel to the newel;
   h. a bracket secured between the fingers of the at least one pair of arms, the bracket lying in a plane perpendicular to a plane bisecting the angle between the arms; and
   i. means adjustably mounted on the bracket for engaging the segment and moving it into compressive relation against the outer periphery of the tread of a tire positioned around the post.

13. The apparatus of claim 12, wherein the means (i) for engaging and moving the segment includes a pressure plate for contacting the segment, and at least one threaded screw coupled between the bracket and plate for moving the pressure plate to and from the longitudinal axis of the post.

14. The apparatus of claim 13, which includes means for detachably mounting the post on the base.

* * * * *